United States Patent
Radjassamy

(10) Patent No.: US 7,313,210 B2
(45) Date of Patent: Dec. 25, 2007

(54) SYSTEM AND METHOD FOR ESTABLISHING A KNOWN TIMING RELATIONSHIP BETWEEN TWO CLOCK SIGNALS

(75) Inventor: Rajakrishnan Radjassamy, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 10/376,835

(22) Filed: Feb. 28, 2003

(65) Prior Publication Data

US 2004/0170200 A1 Sep. 2, 2004

(51) Int. Cl.
*H04L 7/00* (2006.01)
*H04L 5/16* (2006.01)

(52) U.S. Cl. .................. 375/354; 713/400; 375/219; 375/355

(58) Field of Classification Search ........ 375/354–357, 375/371, 358, 377, 359, 362, 219, 220, 316, 375/365, 368, 376, 373, 244, 360; 370/480–503, 370/516, 350, 279, 293, 315, 301, 307, 518; 327/141, 116, 119, 120, 258–259, 291; 377/47, 377/48; 713/400–401, 503, 501–502; 326/93
See application file for complete search history.

(56) References Cited

U.S. PATENT DOCUMENTS

| | | | | |
|---|---|---|---|---|
| 4,558,445 A * | 12/1985 | Novick | ........................ | 370/535 |
| 4,694,472 A * | 9/1987 | Torok et al. | ................. | 375/354 |
| 5,432,823 A * | 7/1995 | Gasbarro et al. | ............ | 375/356 |
| 5,459,764 A * | 10/1995 | Ohgami et al. | ............. | 375/354 |
| 5,822,381 A * | 10/1998 | Parry et al. | .................. | 375/356 |
| 5,887,040 A * | 3/1999 | Jung et al. | ................... | 375/372 |
| 6,078,623 A * | 6/2000 | Isobe et al. | .................. | 375/259 |
| 6,081,141 A | 6/2000 | Young | | |
| 6,104,253 A | 8/2000 | Hall et al. | | |
| 6,130,552 A | 10/2000 | Jefferson et al. | | |
| 6,178,206 B1 * | 1/2001 | Kelly et al. | .................. | 375/257 |
| 6,255,880 B1 * | 7/2001 | Nguyen | ...................... | 327/277 |
| 6,285,172 B1 * | 9/2001 | Torbey | ........................ | 323/237 |
| 6,334,163 B1 * | 12/2001 | Dreps et al. | ................. | 710/260 |
| 6,396,887 B1 | 5/2002 | Ware et al. | | |
| 6,463,092 B1 * | 10/2002 | Kim et al. | ................... | 375/219 |
| 6,584,575 B1 * | 6/2003 | Meyer et al. | ................ | 713/400 |
| 6,661,262 B1 * | 12/2003 | Curran | ........................ | 327/116 |

(Continued)

OTHER PUBLICATIONS

Search Report; Australian Patent Office; Nov. 2, 2005; 4 pages.

(Continued)

*Primary Examiner*—Mohammed Ghayour
*Assistant Examiner*—Sophia Vlahos

(57) ABSTRACT

A system and method for establishing a known timing relationship between two clock signals, wherein a first clock signal is operable to clock data transfer operations from a transmitter domain to a receiver domain and a second clock signal is operable to be transported to the receiver domain. Circuitry is provided for detecting an edge in a global framework clock (GFC) signal that is supplied to the transmitter domain. A common alignment signal is manufactured that is based at least in part upon the GFC signal. A multiplexer and register arrangement is operable to output the second clock signal in response to the common alignment signal which is also used for gating the data transfer operations clocked by the first clock signal.

23 Claims, 5 Drawing Sheets

U.S. PATENT DOCUMENTS

| | | | |
|---|---|---|---|
| 6,668,292 B2 * | 12/2003 | Meyer et al. | 710/61 |
| 6,715,096 B2 * | 3/2004 | Kuge | 713/600 |
| 6,775,300 B2 * | 8/2004 | Kuo | 370/503 |
| 6,775,339 B1 * | 8/2004 | Wildes et al. | 375/354 |
| 6,895,062 B1 * | 5/2005 | Wilson | 375/355 |
| 6,937,680 B2 * | 8/2005 | Fong et al. | 375/357 |
| 7,139,308 B2 * | 11/2006 | Doblar et al. | 375/215 |
| 2001/0033584 A1 | 10/2001 | Dally | |
| 2002/0141515 A1 * | 10/2002 | Enam et al. | 375/340 |
| 2003/0043926 A1 * | 3/2003 | Terashima et al. | 375/257 |

OTHER PUBLICATIONS

Examination Report; Australian Patent Office; Nov. 2, 2005; 4 pages.

Saint-Laurent et al.; "On the Micor-Architectural Impact of Clock Distribution Using Multiple PLLs"; Proceedings of the International Conference on Computer Design; 2001; 7 pages.

Elboim et al.; "A Clock Tuning Circuit for System-on-Chip"; VLSI Systems Research Center; 2002; pp. 607-610.

* cited by examiner

SYSTEM AND METHOD FOR ESTABLISHING A KNOWN TIMING RELATIONSHIP BETWEEN TWO CLOCK SIGNALS

BACKGROUND

Digital electronic systems, e.g., computer systems, often comprise a number of circuit domains that need to communicate with one another using different interfaces, each running at an optimized speed for increased performance. Typically, multiple clock signals having related frequencies are utilized for providing appropriate timing to the interfaces. For instance, a clock signal with a particular frequency may be provided separately to two circuits that are physically spaced apart, wherein one circuit is operable to transmit data to the other. Accordingly, where data is to be transferred at high rates between a transmitting circuit and a receiving circuit, a clock signal is also provided by the transmitting circuit via a separate trace such that data may be registered accurately at the receiving end using a local clock signal that is derived from the transmitted clock signal (which may also be referred to as the transported clock signal). In such applications, it would be necessary that the clock signal used for clocking out data towards the receiving circuit be disposed in a known relationship with the transported clock signal so that proper timing reference may be obtained for capturing the data. There are no known mechanisms that address this requirement, however.

SUMMARY

A system and method for establishing a known timing relationship between two clock signals are disclosed. In one embodiment, a first clock signal is operable to clock data transfer operations from a transmitter domain to a receiver domain and a second clock signal is operable to be transported to the receiver domain. Circuitry is provided for detecting an edge in a global framework clock (GFC) signal that is supplied to the transmitter domain. A common alignment signal is manufactured that is derived at least in part from the GFC signal. A multiplexer and register arrangement is operable to output the second clock signal in response to the common alignment signal which is also used for gating the data transfer operations clocked by the first clock signal.

DETAILED DESCRIPTION OF THE DRAWINGS

Figure 1:
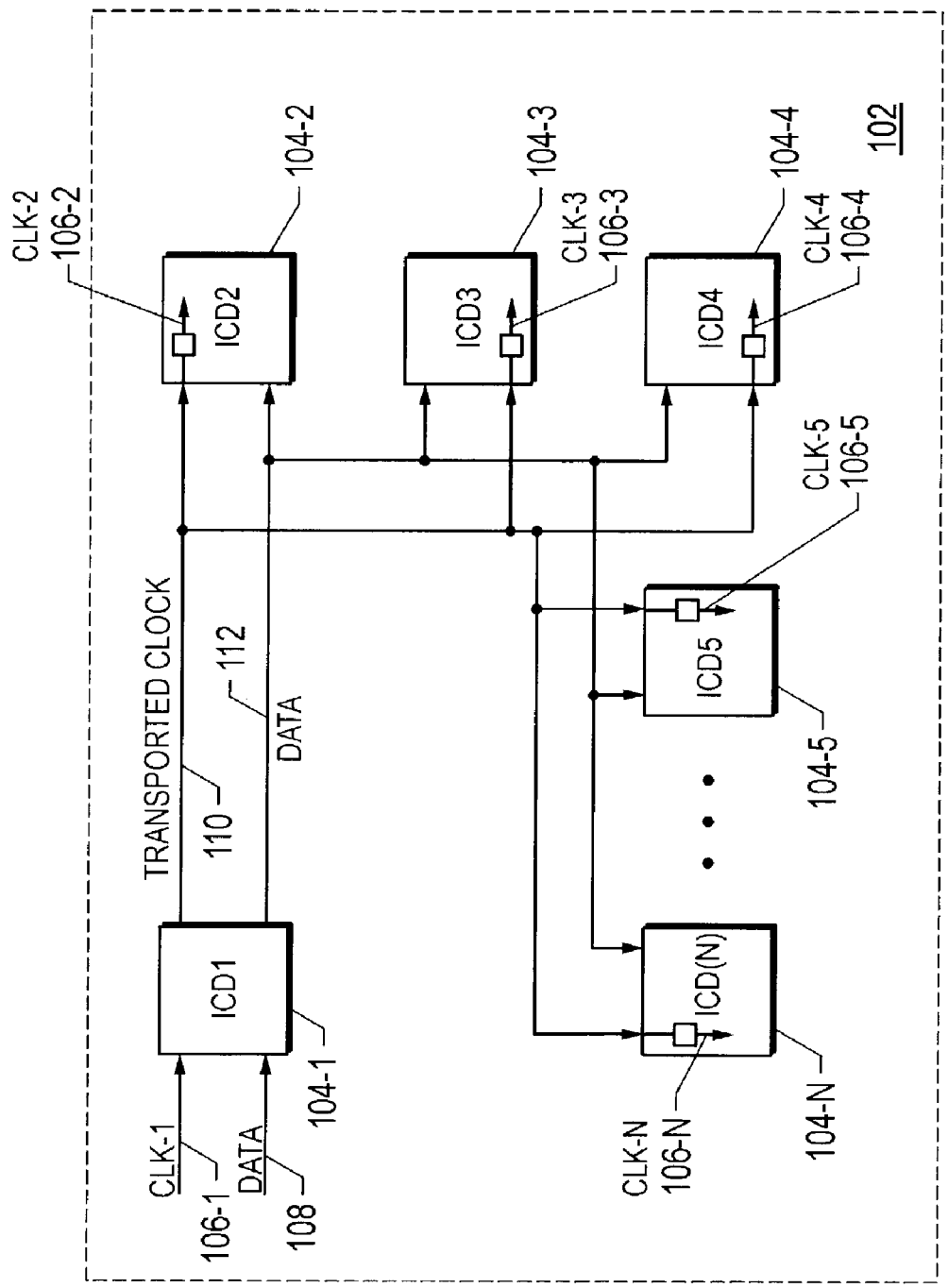
FIG. 1 depicts a functional block diagram of a digital electronic system embodiment where multiple integrated circuit domains disposed at different locations communicate with each other using clock and data signals having a known timing relationship.

In the drawings, like or similar elements are designated with identical reference numerals throughout the several views thereof, and the various elements depicted are not necessarily drawn to scale. Referring now to FIG. 1, depicted therein is a functional block diagram of an exemplary digital electronic system 102 having multiple integrated circuit domains (ICDs) disposed at different locations wherein a circuit design embodiment of the present invention may be advantageously implemented such that ICDs communicate with each other using clock and data signals having a known timing relationship. In one application, the electronic system 102 may comprise a data transfer board in a high-performance computer system such as a multiprocessor system, where data is efficiently transmitted from one source to a number of receiving entities on the board using synchronous signaling. Reference numerals 104-1 through 104-N refer to ICD1 through ICD(N) that communicate with each other wherein data pulses are clocked out from a transmitting domain with a first clock signal, e.g., clock signal 106-1, that has a known timing relationship with a second clock signal, e.g., clock signal 110, that is transported to the receiving domains. In one implementation, ICD1 104-1 is operable to receive data 108 from another domain external to the electronic system 102, wherein the data is clocked out using CLK-1 106-1 on a data path 112 that fans out to the remaining ICDs. Also, to synchronize data registration operations by the receiving ICDs that are disposed at variable distances with respect to the transmitting ICD1 104-1, a transported clock signal is provided using clock path 110 that extends from ICD-1 104-1 to the remaining ICDs. The transported clock signal may be manufactured as will be set forth below in reference to FIG. 2. Clock receiver circuitry in each receiving ICD uses the transported clock signal to manufacture its own internal clock signal that provides timing with respect to the various operations of its domain, e.g., data capture and cleanup, data processing by core circuitry, et cetera. In FIG. 1, reference numerals 106-2 through 106-N refer to the internal clock signals generated by the receiving ICDs that are derived from the transported clock signal 110, which is in a known timing relationship with CLK-1 106-1 used for clocking out data.

Figure 2:
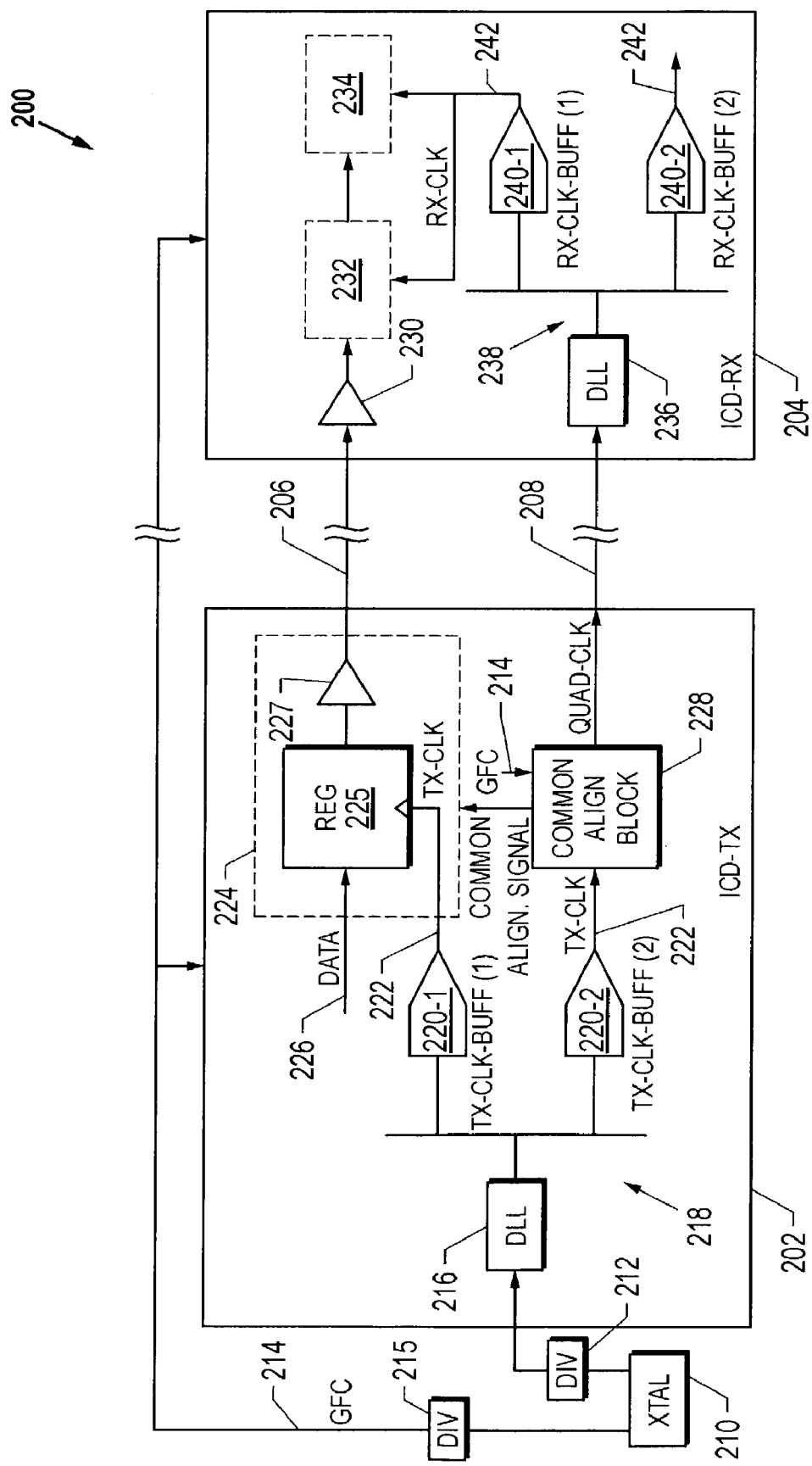
FIG. 2 depicts a functional block diagram of a generic transmitter and receiver combination of the electronic system embodiment shown in FIG. 1 for clocking data from the transmitter circuit domain to the receiver circuit domain with a clock signal that is disposed in a known relationship with a clock signal transported to the receiver circuit.

FIG. 2 depicts a functional block diagram of an embodiment of a generic transmitter and receiver ICD combination subsystem 200. Reference numeral 202 refers to a data/clock transmitting ICD (ICD-TX) that is operable with a clock signal labeled as TX-CLK 222. A global timing source such as a crystal (XTAL) 210 is operable for providing all necessary clock signals with respect to the TX/RX ICD combination subsystem 200. A divider (DIV) block 212 operates to reduce the frequency of the raw timing signal provided by XTAL 210. A delay logic loop (DLL) block 216 provided as part of ICD-TX 202 conditions the incoming timing signal output by the DIV block 212. The output of DLL 216 is operable as the core clock for ICD-TX 202 which is provided to a number of clock buffers that form a clock tree 218. Reference numerals 220-1 and 220-2 illustrate two such clock buffers, TX-CLK-BUFF(1) and TX-CLK-BUFF(2), respectively. The output of the clock buffers is provided as individual core clock signals TX-CLK 222 that provide timing with respect to various internal operations of the ICD-TX circuitry.

Another divider block 215 is also provided for generating a global framework clock (GFC) signal 214 that is substantially slower than the core clock signal used by ICD-TX 202. For example, XTAL 210 may generate a raw 500 MHz clock signal that can be divided to a 250 MHz clock for driving the transmitter domain's clock tree 218. On the other hand, the GFC 214 may be manufactured such that it is 32 times slower than the core clock (i.e., the GFC signal has a single tick for every 32 ticks of the core clock). As will be seen in greater detail hereinbelow, the GFC signal 214 is not only used an overall timing/monitoring reference signal that is provided to all ICDs of the system, but it is also used in a circuit embodiment of the present invention for effectuating a known timing relationship between two independent clock signals.

Data transfer operations are effectuated by a data out block 224 of the transmitter domain that is clocked by TX-CLK 222. Data 226 that is to be transmitted is registered by a data out register stage 225 whose output is provided to a driver/buffer stage 227 coupled to an outgoing data path 206. A common alignment block 228 is operable responsive at least in part to another TX-CLK signal 222 and GFC 215 for outputting a transported clock (QUAD-CLK) signal that is provided to a receiving domain ICD-RX 204 via a clock path 208. Further, the common alignment block 228 is also operable to generate a common alignment control signal that controls register block 225 of the data out block 224 such that data may be transferred only when the control signal is asserted. Data received via data path 206 is staged through a driver/buffer 230 whose output is provided to data registration circuitry 232 of the receiver domain. Conditioned/captured data may thereafter be forwarded to the internal core circuitry 234 thereof. As will be seen below, by deriving the common alignment control signal from the GFC signal and using it for gating the data out operations as well as for generating the transported clock signal, repeatability and reliability of inter-domain data transfer functionality may be ensured.

A receiver DLL 236 is operable with reference to the received QUAD-CLK via clock path 208, whose output is provided to a number of clock buffers that form a clock tree 238 of ICD-RX 204. By way of example, reference numerals 240-1 and 240-2 illustrate two such buffers, RX-CLK-BUFF(1) and RX-CLK-BUFF(2), respectively. The output of the clock buffers is operable as a clock signal (RX-CLK) 242 internal to the receiver domain for timing its operations. Since the receiver's clock signal is derived from the transported clock signal provided by the transmitter, it is necessary that the clock signal used for clocking out data on data path 206 be disposed in a known timing relationship with respect to the transported clock signal so that the incoming data may be accurately registered without incurring transfer-related timing errors.

Taking FIGS. 1 and 2 together, it should be apparent to one skilled in the art that the subsystem 200 described above is an embodiment that essentially captures a subportion of the electronic system 102 shown in FIG. 1. Accordingly, data signal path 206 and QUAD-CLK 208 illustrated in FIG. 2 are operable analogous to the data signal path 112 and transported clock signal 110 depicted in FIG. 1.

Figure 3:
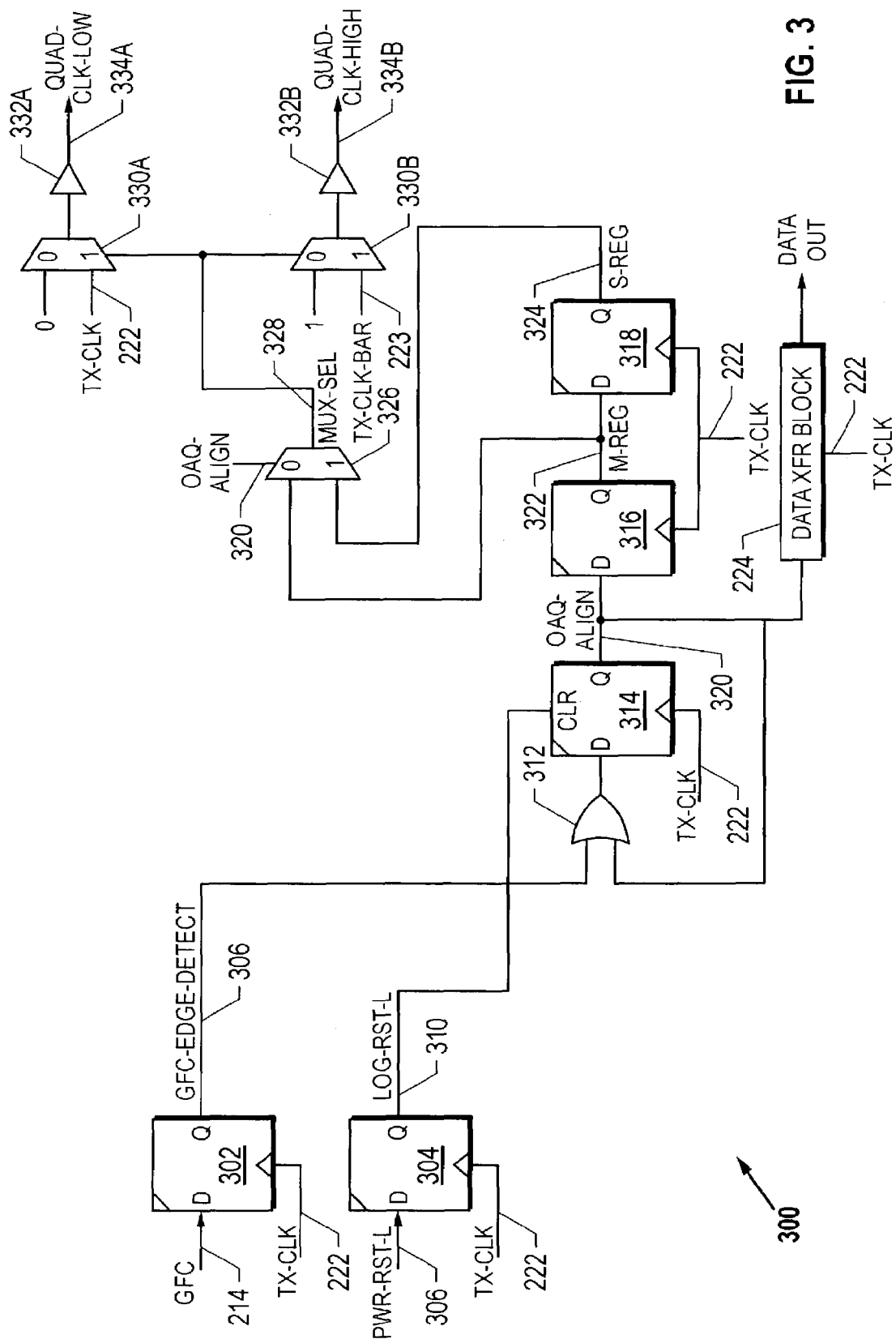
FIG. 3 depicts an embodiment of a circuit system for establishing a known timing relationship between two independent clock signals.

FIG. 3 depicts an embodiment of a circuit system 300 for establishing a known timing relationship between two independent clock signals by manufacturing a common alignment signal that controls both data out operations (clocked with a first clock signal) and generation of a transported clock signal (i.e., a second clock signal) of a transmitting domain, e.g., ICD-TX 202 shown in FIG. 2 wherein the circuit system 300 is operable as the common alignment block 228 thereof. Circuit means comprising one or more register stages 302 or their well known equivalents is provided for detecting an edge, e.g., a rising edge, in the GFC signal 214 that is applied to the D input of the register stage. The CLK input of the register stage 302 is activated by a first clock signal, e.g., TX-CLK 222. Since it is desirable to establish the timing relationship between the clock signals at the earliest upon a system reset, circuit means comprising one or more register stages 304 or their well known equivalents is provided for registering an active low reset signal, labeled as PWR-RST-L 306, that is applied to the D input of the register stage. Again, the CLK input of the register stage 304 is activated by the first clock signal, TX-CLK 222. Upon detecting the occurrence of a starting edge in the GFC signal 214, the detector register 302 outputs a GFC-EDGE-DETECT signal 308 that is coupled to a two-input OR gate 312. The other input of the OR gate 312 is driven by a feedback path so that once a common alignment signal 320 is generated upon the system reset and occurrence of the GFC's starting edge, it stays active. Accordingly, circuit means comprising a clearable register 314 or its well known equivalents coupled to OR gate 312 at its D input is provided with a clear (CLR) input terminal that is driven by the output of register 304, i.e., LOG-RST-L 310. Once again, the clearable register is clocked by TX-CLK 222. The Q output of the clearable register 314 is operable as the common alignment (OAQ-ALIGN) signal 320 that is used for controlling both data transfer operations from the transmitting domain as well as the generation of the transported clock signal (e.g., the QUAD-CLK signal) therefrom. With respect to the data transfer, the OAQ-ALIGN 320 signal is used as a gating signal for the data out transfer circuitry 224 to ensure that the data that is clocked out is in a fixed relationship as to the clock signal that is generated for transport.

As will be set forth below in additional detail, a multiplexer/register arrangement is provided for outputting the transported clock signal in response to the common alignment signal. A master/slave register circuit portion comprising a master register 316 whose Q output is coupled to drive the D input of a slave register 318 is operable to register the OAQ-ALIGN 320 signal twice such that the outputs of the registers, M-REG 322 and S-REG 324, respectively, are supplied to the logic low and logic high inputs of a 2:1 multiplexer (MUX) element 326. MUX 326 is controlled by the OAQ-ALIGN 320 in the generation of a MUX-SEL control signal 328. Further, MUX 326 operates in such a manner that the creation of runt pulses is avoided. A pair of 2:1 MUXes 330A and 330B are provided whose control inputs are driven by MUX-SEL 328 so as to toggle between TX-CLK 222 and its complement TX-CLK-BAR 223. The "0" or logic low input of MUX 330A is tied to "0" whereas the "0" input of MUX 330B is tied to "1", whereby the MUXes respectively output a logic low and a logic high before a clock signal is generated. Upon the occurrence of MUX-SEL 328, the outputs of the 2:1 MUXes 330A and 330B toggle to their respective active inputs, i.e., TX-CLK and TX-CLK-BAR signals. Each clock output is buffered by a corresponding clock buffer stage 332A or 332B in order to generate a QUAD-CLK-LOW 334A or QUAD-CLK-HIGH 334B that are transmitted to the receiving ICD.

Figure 4:
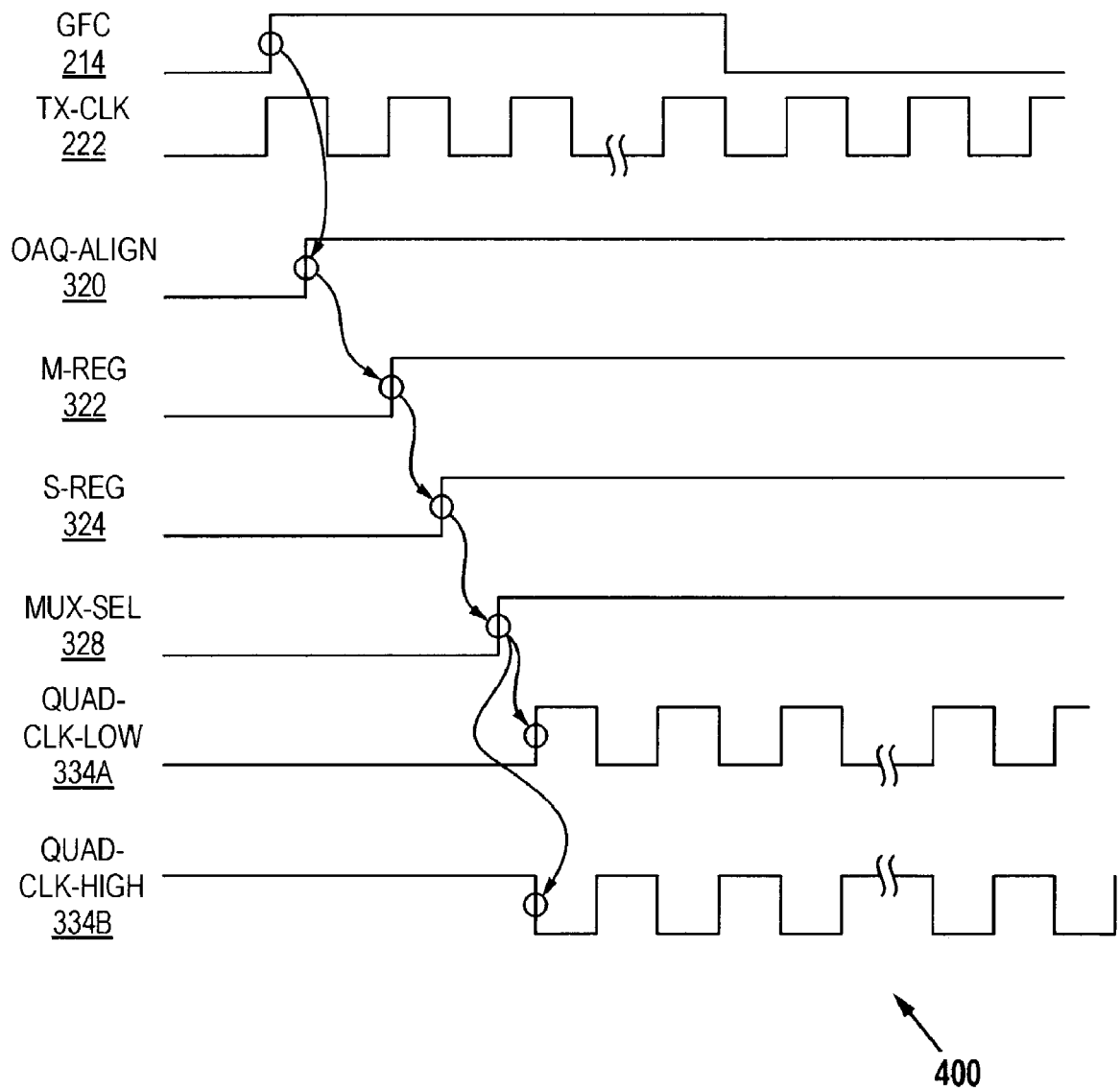
FIG. 4 depicts a timing diagram relating to the various signals used in establishing a known timing relationship between two independent clock signals by the system shown in FIG. 3.

Referring now to FIG. 4, depicted therein is a timing diagram panel 400 relating to the various signals used in establishing a known timing relationship between two clocks by the system shown in FIG. 3. As can be readily seen, upon detection of a starting edge (e.g., a rising edge)

in GFC 214, a corresponding edge (i.e., a rising edge) in OAQ-ALIGN 320 is generated, once the system is taken out of reset. As pointed out earlier, the feedback loop arrangement in the circuitry responsible for generating the OAQ-ALIGN signal maintains the logic high level once a rising edge in the GFC signal is detected that forms the reference point for establishing timing relationships in the transmitting domain. Subsequently, the master/slave register arrangement registers the OAQ-ALIGN signal twice which results in the rising edges in M-REG 322 and S-REG 324. In response thereto, a rising edge in MUX-SEL 328 is generated, which thereafter controls the 2:1 MUXes used for outputting the transported clock signal and its complement, i.e., QUAD-CLK-LOW 334A or QUAD-CLK-HIGH 334B, towards a receiving domain.

Figure 5:
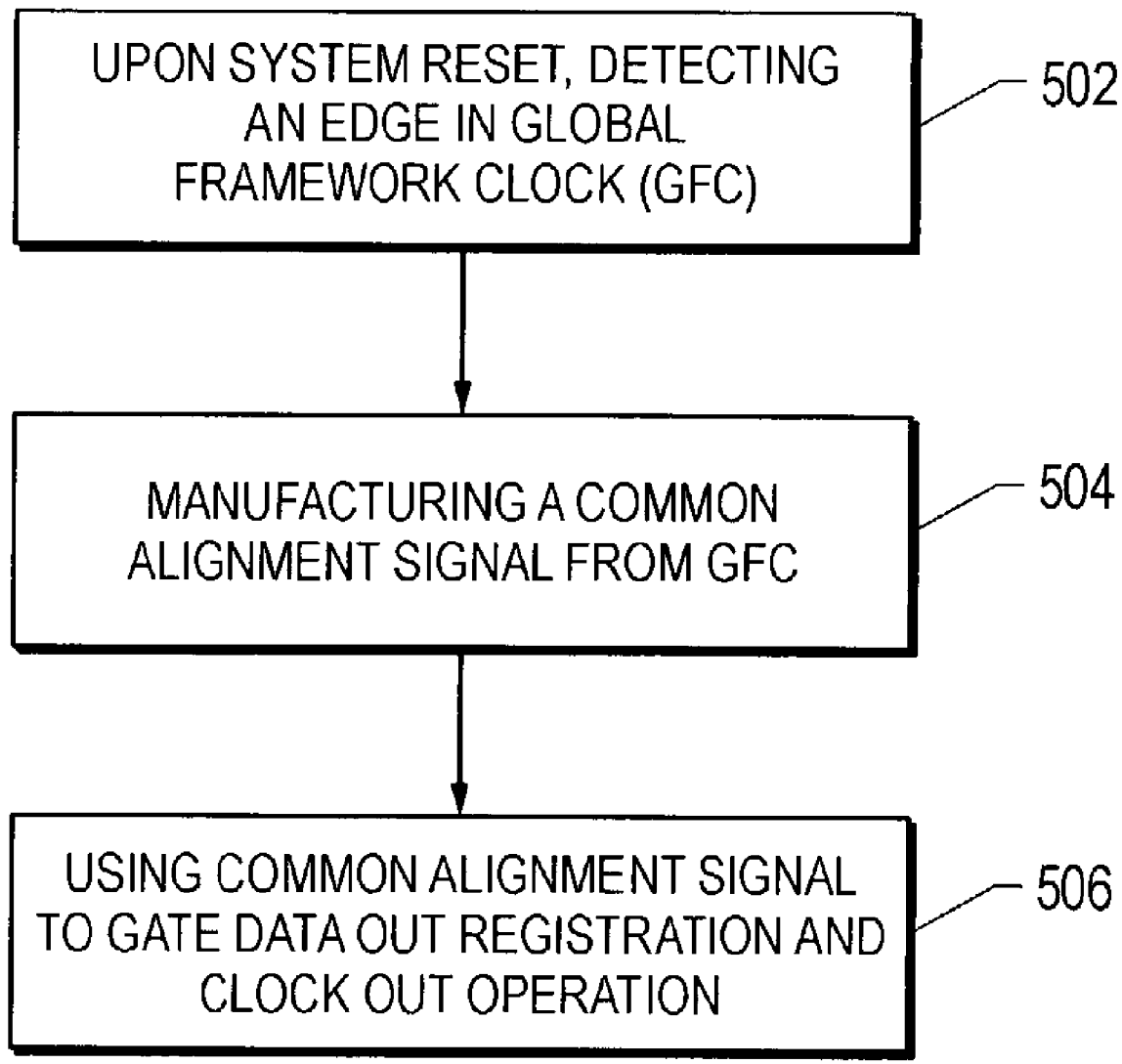
FIG. 5 depicts a flow chart of the operations involved in one embodiment of a method for establishing a known timing relationship between two independent clock signals.

FIG. 5 is a flow chart of the various operations involved in one embodiment of a method for establishing a known timing relationship between two independent clock signals. At block 502, a starting edge is detected in a GFC clock signal that provides an overall timing reference signal to an electronic system having one or more transmitter ICDs and one or more receiver ICDs. In one implementation, the first rising edge in the GFC signal upon a system reset is detected. Thereafter, a common alignment signal is manufactured that is derived at least in part from the GFC signal (block 504). The common alignment signal is subsequently used in gating the data transfer operations, wherein outgoing data is registered using a first clock signal. Further, the common alignment signal is also used for controlling the generation of a second clock signal in a clock out operation, whereby the second clock signal is transported to a receiver domain. These operations are consolidated at block 506.

Based on the foregoing Detailed Description, it should be appreciated that an embodiment of the present invention has been provided in accordance herewith for advantageously establishing a known timing relationship between two clocks in a digital electronic system. The known timing relationship may be used by a receiving domain for properly registering the incoming data whereby data transfer errors can be avoided, especially in high-speed data transmission applications.

Although the aforesaid Detailed Description has been set forth with reference to certain illustrations, it is to be understood that the forms of the invention shown and described are to be treated as exemplary embodiments only. For instance, various logic modules, control signals and their logic levels illustrated in the FIGURES of the present patent application may be implemented using a number of different electronic devices and/or gate combinations, with any level of integration. Accordingly, various changes, substitutions and modifications can be realized therein without departing from the spirit and scope of the invention as defined by the appended claims.

What is claimed is:

1. A system for establishing a known timing relationship between a first clock signal and a second clock signal, comprising:
    means for clocking data transfer operations from a transmitter domain to a receiver domain using said first clock signal;
    means for detecting an edge in a global framework clock (GFC) signal that is supplied to said transmitter domain, wherein said means for detecting an edge comprises a register arrangement that is clocked using said first clock signal;
    means for manufacturing a common alignment signal within said transmitter domain that is derived at least in part from said GFC signal; and
    a multiplexer arrangement operating to output said second clock signal from said transmitter domain to said receiver domain in response to said common alignment signal, wherein said data transfer operations are gated with said common alignment signal.

2. The system for establishing a known timing relationship between two clocks as set forth in claim 1, wherein said means for manufacturing said common alignment signal comprises a register arrangement that is clocked using said first clock signal.

3. The system for establishing a known timing relationship between said first clock signal and said second clock signal as set forth in claim 2, wherein said register arrangement's data input is coupled to a logic gate driven by said edge in said GFC signal.

4. The system for establishing a known timing relationship between said first clock signal and said second clock signal as set forth in claim 1, wherein said means for manufacturing said common alignment signal is activatable upon a system reset.

5. The system for establishing a known timing relationship between said first clock signal and said second clock signal as set forth in claim 1, further including a master and slave register arrangement coupled to said means for manufacturing said common alignment signal, said master and slave register arrangement operating to provide two outputs suppled to a first 2:1 multiplexer (MUX) of said multiplexer arrangement.

6. The system for establishing a known timing relationship between two clocks said first clock signal and said second clock signal as set forth in claim 5, wherein said first 2:1 MUX's output is provided to control second and third 2:1 MUXes of said multiplexer arrangement, said second 2:1 MUX operating to output said second clock signal and said third 2:1 MUX operating to output said second clock's complement.

7. A method for establishing a known timing relationship between a first clock signal and a second clock signal, comprising:
    clocking data transfer operations from a transmitter domain to a receiver domain using said first clock signal;
    detecting an edge in a global framework clock (GFC) signal that is supplied to said transmitter domain, wherein said edge in said GFC signal is detected by a register arrangement that is clocked using said first clock signal;
    manufacturing a common alignment signal within said transmitter domain that is at least in part derived from said GFC signal; and
    using said common alignment signal for gating said data transfer operations and for controlling a multiplexer arrangement to output said second clock signal from said transmitter domain to said receiver domain.

8. The method for establishing a known timing relationship between said first clock signal and said second clock signal as set forth in claim 7, wherein said common alignment signal is manufactured upon occurrence of a system reset.

9. The method for establishing a known timing relationship between said first clock signal and said second clock signal as set forth in claim 7, wherein said common alignment signal is manufactured by a register arrangement that is clocked using said first clock signal.

10. The method for establishing a known timing relationship between said first clock signal and said second clock signal as set forth in claim 7, wherein said common alignment signal operates to drive a master and slave register arrangement that provides two outputs supplied to a first 2:1 multiplexer (MUX) of said multiplexer arrangement.

11. The method for establishing a known timing relationship between said first clock signal and said second clock signal as set forth in claim 10, wherein said first 2:1 MUX's output operates to control second and third 2:1 MUXes of said multiplexer arrangement, said second 2:1 MUX operating to output said second clock signal and said third 2:1 MUX operating to output said second clock signal's complement.

12. A computer system provided with circuitry for establishing a known timing relationship between a first clock signal and a second clock signal, said circuitry comprising:
   means for clocking data transfer operations from a transmitter domain to a receiver domain using said first clock signal;
   a register operating responsive to said first clock signal for detecting an edge in a global framework clock (GFC) signal that is supplied to said transmitter domain;
   means for manufacturing a common alignment signal within said transmitter domain that is derived at least in part from said GFC signal; and
   a multiplexer arrangement operating to output said second clock signal from said transmitter domain to said receiver domain in response to said common alignment signal, wherein said data transfer operations are gated with said common alignment signal.

13. The computer system provided with circuitry for establishing a known timing relationship between said first clock signal and said second clock signal as set forth in claim 12, wherein said means for manufacturing said common alignment signal comprises a register arrangement that is clocked using said first clock signal.

14. The computer system provided with circuitry for establishing a known timing relationship between said first clock signal and said second clock signal as set forth in claim 13, wherein said register arrangement's data input is coupled to a logic gate driven by said edge in said GFC signal.

15. The computer system provided with circuitry for establishing a known timing relationship between said first clock signal and said second clock signal as set forth in claim 12, further including means for activating said means for manufacturing said common alignment signal upon a system reset.

16. The computer system provided with circuitry for establishing a known timing relationship between said first clock signal and said second clock signal as set forth in claim 12, further including a master and slave register arrangement coupled to said means for manufacturing said common alignment signal, said master and slave register arrangement operating to provide two outputs suppled to a first 2:1 multiplexer (MUX) of said multiplexer arrangement.

17. The computer system provided with circuitry for establishing a known timing relationship between said first clock signal and said second clock signal as set forth in claim 16, wherein said first 2:1 MUX's output is provided to control second and third 2:1 MUXes of said multiplexer arrangement, said second 2:1 MUX operating to output said second clock signal and said third 2:1 MUX operating to output said second clock's complement.

18. The computer system provided with circuitry for establishing a known timing relationship between said first clock signal and said second clock signal as set forth in claim 12, wherein said GFC signal is generated from a system clock provided by a timing source.

19. The computer system provided with circuitry for establishing a known timing relationship between said first clock signal and said second clock signal as set forth in claim 18, wherein said GFC signal is supplied to said receiver domain.

20. A circuit for establishing a known timing relationship between two clocks, wherein a first clock signal is operable to clock data transfer operations from a transmitter domain to a receiver domain and a second clock signal is operable to be transported to said receiver domain, comprising:
   a register operating responsive to said first clock signal for detecting an edge in a global framework clock (GFC) signal that is supplied to said transmitter domain;
   a register operating responsive to said first clock signal for registering a system reset signal;
   a clearable register having its data input coupled to an OR logic gate and its clear terminal coupled to an output from said register for registering said system reset signal, wherein a first input of said OR logic gate is driven by an output from said register for detecting said edge in said GFC signal and a second input of said OR logic gate is coupled to said clearable register's data output in a feedback loop path, said clearable register operating to manufacture a common alignment signal that is derived at least in part from said GFC signal;
   a master register operating responsive to said first clock signal for generating a master register output signal by registering said common alignment signal;
   a slave register operating responsive to said first clock signal for generating a slave register output signal by registering said master register output signal;
   a first 2:1 multiplexer (MUX) element coupled to said master and slave registers such that its logic low input is driven by said master register output signal and its logic high input is driven by said slave register output signal, wherein said common alignment signal operates to control said 2:1 MUX element for generating a MUX selection control signal;
   a second 2:1 MUX element operating responsive to said MUX selection control signal for generating a second clock signal dependent on said first clock signal; and
   a third 2:1 MUX element operating responsive to said MUX selection control signal for generating said second clock signal's complement.

21. The circuit for establishing a known timing relationship between two clocks as set forth in claim 20, wherein said GFC signal is provided to said receiver domain.

22. The circuit for establishing a known timing relationship between two clocks as set forth in claim 20, wherein said GFC signal has a frequency that is 1/32th of said first clock signal's frequency.

23. The circuit for establishing a known timing relationship between two clocks as set forth in claim 22, wherein said first clock signal's frequency is 250 MHz.

* * * * *

UNITED STATES PATENT AND TRADEMARK OFFICE
CERTIFICATE OF CORRECTION

PATENT NO. : 7,313,210 B2  Page 1 of 1
APPLICATION NO. : 10/376835
DATED : December 25, 2007
INVENTOR(S) : Rajakrishnan Radjassamy It is certified that error appears in the above-identified patent and that said Letters Patent is hereby corrected as shown below:

Column 6, line 10, in Claim 2, delete "two clocks" and insert -- said first clock signal and said second clock signal --, therefor.

Signed and Sealed this

Third Day of June, 2008

JON W. DUDAS
*Director of the United States Patent and Trademark Office*